United States Patent
Ekanadham et al.

(10) Patent No.: US 8,683,175 B2
(45) Date of Patent: Mar. 25, 2014

(54) SEAMLESS INTERFACE FOR MULTI-THREADED CORE ACCELERATORS

(75) Inventors: Kattamuri Ekanadham, Mohegan Lake, NY (US); Hung Q. Le, Austin, TX (US); Jose E. Moreira, Yorktown Heights, NY (US); Pratap C. Pattnaik, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 13/048,214

(22) Filed: Mar. 15, 2011

(65) Prior Publication Data

US 2012/0239904 A1 Sep. 20, 2012

(51) Int. Cl.
*G06F 9/30* (2006.01)
*G06F 12/10* (2006.01)

(52) U.S. Cl.
USPC ........................................................ 711/207

(58) Field of Classification Search
None
See application file for complete search history.

(56) References Cited

U.S. PATENT DOCUMENTS

| | | | |
|---|---|---|---|
| 6,684,305 B1 * | 1/2004 | Deneau | 711/159 |
| 6,952,214 B2 | 10/2005 | Naegle et al. | |
| 7,490,215 B2 * | 2/2009 | Baxter et al. | 711/206 |
| 7,509,476 B2 | 3/2009 | Hass et al. | |
| 7,614,056 B1 | 11/2009 | Saxe et al. | |
| 7,623,134 B1 * | 11/2009 | Danilak | 345/568 |
| 2002/0065989 A1 * | 5/2002 | Chauvel et al. | 711/130 |
| 2005/0149937 A1 | 7/2005 | Pilkington | |
| 2006/0161704 A1 * | 7/2006 | Nystad et al. | 710/105 |
| 2008/0222396 A1 | 9/2008 | Spracklen et al. | |
| 2008/0256330 A1 | 10/2008 | Wang et al. | |
| 2009/0216958 A1 | 8/2009 | Biles et al. | |
| 2010/0153686 A1 * | 6/2010 | Frank | 712/34 |
| 2011/0161620 A1 * | 6/2011 | Kaminski et al. | 711/207 |
| 2012/0066474 A1 * | 3/2012 | Funk | 711/207 |
| 2012/0117301 A1 * | 5/2012 | Wingard | 711/6 |
| 2012/0233439 A1 * | 9/2012 | Ginzburg et al. | 711/206 |

OTHER PUBLICATIONS

Hughes et al., "Transparent Multi-core Cryptographic Support on Niagara CMT Processors", IWMSE'09, May 18, 2009, ICSE'09 Workshop, pp. 81-88.

* cited by examiner

*Primary Examiner* — Kaushikkumar Patel
(74) *Attorney, Agent, or Firm* — Scully, Scott, Murphy & Presser PC; Gail H. Zarick, Esq.

(57) ABSTRACT

A method, system and computer program product are disclosed for interfacing between a multi-threaded processing core and an accelerator. In one embodiment, the method comprises copying from the processing core to the hardware accelerator memory address translations for each of multiple threads operating on the processing core, and simultaneously storing on the hardware accelerator one or more of the memory address translations for each of the threads. Whenever any one of the multiple threads operating on the processing core instructs the hardware accelerator to perform a specified operation, the hardware accelerator has stored thereon one or more of the memory address translations for the any one of the threads. This facilitates starting that specified operation without memory translation faults. In an embodiment, the copying includes, each time one of the memory address translations is updated on the processing core, copying the updated one of the memory address translations to the hardware accelerator.

20 Claims, 1 Drawing Sheet

SEAMLESS INTERFACE FOR MULTI-THREADED CORE ACCELERATORS

BACKGROUND

This invention generally relates to data processing systems, and more specifically, the invention relates to data processing systems including hardware accelerators.

Accelerators are special hardware functional units designed to perform certain operations efficiently, as compared to a general purpose processor, and hardware accelerators are often included in processor-based systems such as computer systems to perform specific, predefined tasks in hardware rather than in software. Traditionally, accelerators perform complex parallel transformations on relatively small input data, which makes the accelerators very attractive for performance enhancement. Additionally, in some cases, the hardware acceleration can be more power-efficient than performing the same tasks in software. Power efficiency can be even greater if the hardware accelerators are incorporated on the same semiconductor substrate ("on-chip") as the processors. Particularly, integrating hardware accelerators onto multi-core chips such as chip multiprocessors (CMP) and/or chip multithreaded (CMT) processors can be efficient, because the accelerator can be shared among the cores/threads.

Currently, there is a large amount of software over-head associated with dispatching a task to a shared hardware accelerator (e.g. on the order of tens of thousands of processor clock cycles). Access to the hardware accelerator is typically managed by the lowest-level and most-privileged layer of software in the system. Managing access in this fashion helps ensure that the hardware accelerator is shared in a secure fashion (preventing one thread/core from disrupting, and particularly corrupting, the task issued by another thread/core to the hardware accelerator), and also in a fair fashion so that various threads/cores have the opportunity to take advantage of the hardware accelerator. The OS can implement the fairness and security in a non-virtualized environment. In a virtualized environment, the Hypervisor implements the fairness and security.

Accelerators suffer from several problems when they have to operate on a lot of data. For example, passing all the data via commands is inconvenient, and accessing the data from memory gets complicated, as this requires proper address translations on behalf of the calling context. Also, handling exceptions during execution of the accelerator requires special provisions, and accelerators sharing memory management hardware with the core, tend to adversely pollute the cache/TLB that may degrade the performance.

BRIEF SUMMARY

Embodiments of the invention provide a method, system and computer program product for interfacing between a multi-threaded processing core and an accelerator. In one embodiment, the method comprises copying from the processing core to the hardware accelerator, memory address translations for each of multiple threads operating on the processing core, and simultaneously storing on the hardware accelerator one or more of the memory address translations for each of the threads. In this way, whenever any one of the multiple threads operating on the processing core instructs the hardware accelerator to perform a specified operation, the hardware accelerator can use one or more of the memory address translations stored thereon for said any one of the threads to facilitate starting said specified operation without memory translation faults.

In an embodiment, the copying includes, each time one of said memory address translations is updated on the processing core, copying the updated one of the memory address translations to the hardware accelerator. In one embodiment, the method further comprises when one of said memory address translations on the hardware accelerator is changed, changing said one of the memory address translations on the processing core to help maintain memory address translation consistency between the hardware accelerator and the processing core. In one embodiment, the method further comprises when one of said memory address translations is invalidated on the processing core, invalidating said one of the memory address translations on the hardware accelerator to help maintain memory address translation consistency between the processing core and the hardware accelerator.

In an embodiment, the hardware accelerator includes a translation lookaside buffer (TLB) storing the memory address translations copied to the hardware accelerator, and the processing core includes a TLB storing the memory address translations for the threads operating on the processing core; and the method further comprises operating the TLB of the processing core independently of the TLB of the hardware accelerator. In one embodiment, the operating the TLB of the processing core includes updating the memory address translations in the TLB of the processing core independently of changes to the memory address translations in the TLB of the hardware accelerator. In an embodiment, (a) whenever an entry in the TLB of either the processor core or the accelerator is invalidated (i.e., removed), that entry is removed from both TLBs; (b) whenever the core TLB makes a new entry, that entry is copied into the accelerator's TLB (over-writing an existing entry for that thread); and (c) whenever the accelerator TLB makes a new entry, the core's TLB is unaffected.

In an embodiment, system software operates on the processing core, and the method further comprises when the hardware accelerator encounters a translation fault during execution of a command from one of the threads, the hardware accelerator submitting an interrupt to said system software to respond to said translation fault. In one embodiment, the method further comprises said system software, in response to said interrupt, providing a desired translation to the hardware accelerator to correct for said translation fault. In an alternate embodiment, the method further comprises said system software, in response to said interrupt, terminating said one of the threads.

In one embodiment, the method further comprises, when the processing core and the hardware accelerator encounter translation faults, the processing core issuing TLB write instructions in response to said translation faults; and the processing core tracking whether each TLB write instruction is issued in the context of a translation fault generated by the processing core or by the hardware accelerator, and updating the corresponding TLB. Specifically, the TLB of the processing core is updated when said each TLB write instruction is issued in the context of a translation fault generated by the processing core, and the TLB of the hardware accelerator is updated when said each TLB write instruction is issued in the context of a translation fault generated by the hardware accelerator.

Embodiments of the invention accomplish a number of important goals. Among these are: seamless software interface; seamless hardware interface; seamless system software interface; non-intrusive accelerator operations; and accelerator sharing. Each of these is discussed below.

Seamless Software Interface:

In embodiments of the invention, the call to an accelerated function is the same as a conventional function call in a high level language. The only source change a user needs to make is to add a pragma (akin to an inline pragma) to indicate that the function should be performed by an accelerator. In response, a compiler directs an existing function call to an accelerator that can perform that function. The lower-level ABI also remains intact. For instance, in one implementation of the invention, a function call stores the input parameters in registers R3 thru R8 before the call, and the function is expected to return its result in the same registers.

Seamless Hardware Interface:

In an embodiment of the invention, from the processor perspective, the call to an accelerated function is a single instruction, referred to herein as the special instruction acc, analogous to a load instruction that has a few input/output register operands. To simplify the design further, in an implementation, the acc instruction has implicit input/output operand registers R3 thru R8 (typically, an opcode, source and destination memory addresses and lengths). The execution of the acc instruction follows normal pipeline processing except for the following: It needs to fetch a slightly larger number of input register operands (like 6 as opposed to 2 or 3). In view of the longer latency for accelerator operations, the executing thread gets suspended as soon as the acc instruction is submitted to the accelerator, to facilitate energy saving and also to provide system software interface when needed to deal with exceptions during the accelerator execution. The thread resumes when the operation is completed.

Seamless System Software Interface:

The execution of an accelerator function could suffer exceptions (e.g. address translation fault, protection fault, operation exception etc.). In an embodiment of the invention, such exceptions are presented to the system software on behalf of the thread executing the acc instruction, in exactly the same manner as any normal instruction. The system software can resolve the exceptions according to normal rules and is able to either resume the operation or abort the execution of the thread. The designer of an accelerator is free to choose suitable mechanisms to resume execution or do roll backs as appropriate, upon clearing an exception. Avoiding changes to system software can be difficult when such software directly manipulates hardware resources that are possibly replicated inside the accelerator.

Non-Intrusive Accelerator Operation:

In an embodiment of the invention, the accelerator is able to operate independently without affecting the resources and state of the core that the accelerator attached to (with the exception of suspending the thread that initiated an acceleration function until the function completes). In particular, accelerator execution does not cause any changes to the caches or TLBs of the core (except for invalidating any cache lines changed by the accelerator as per normal rules of coherence). All memory accesses and address translations made by the accelerator are coherent and consistent with respect to the rest of the system. In an implementation of the invention, an accelerator is connected to the system coherence bus through which all memory accesses are made. The accelerator maintains its own TLB for translations, which is serviced by the same system software that keeps all translations consistent.

Accelerator Sharing:

In an embodiment of the invention, an accelerator is attached to a core (only one per core) and is shared by all threads supported by that core. To facilitate this, the accelerator provides command buffers to deposit the inputs sent by the accelerator instructions executed by any of the threads (there can be at most one per thread, as a thread is suspended until its accelerator instruction is completed).

To expedite the accelerator operation, a core may make extra provisions to share further information that is readily available in the core. A few of these extra provisions are described below.

An accelerator may suffer translation faults as it starts executing a new command from a thread. The invoking thread typically will have translations for some of the operands in its own TLB before submitting the command to the accelerator. To give a push start for the accelerator, special provisions can be made to initialize the accelerator's TLB with translations for some initial operand pages.

Since the thread initiating an accelerator function will be suspended until the accelerator function is completed, the core may make provisions to save/suspend/divert its resources (such as its register set) in the interim, to improve utilization or reduce power consumption, as long as the core can restore these resources when they are needed later.

DETAILED DESCRIPTION

Figure 1:
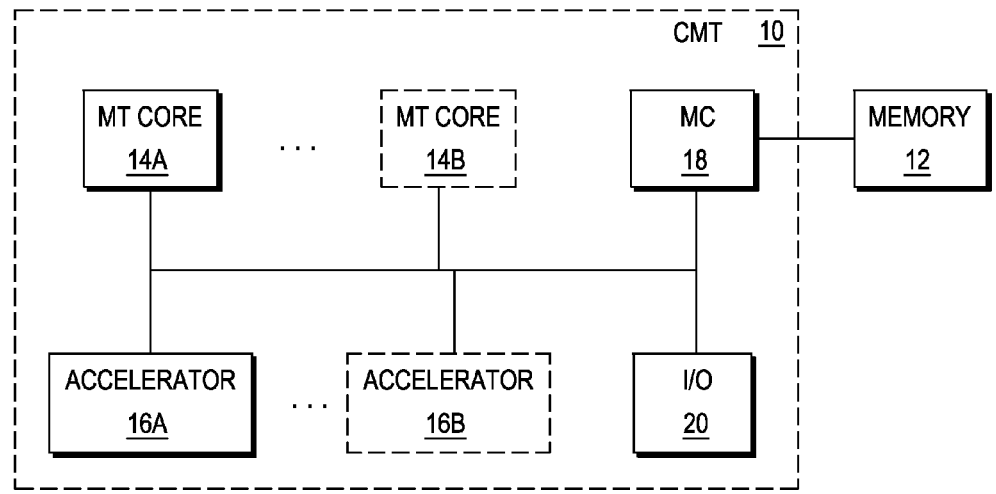
FIG. 1 is a block diagram of one embodiment of a chip multi-threaded device including a hardware accelerator.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram of one embodiment of a chip multithread (CMT) device 10 coupled to a memory 12. Specifically, in the illustrated embodiment, the CMT 10 comprises at least one multithreaded (MT) core 14A and at least one hardware accelerator 16A. In some embodiments, there may be multiple MT cores, such as MT core 14B, and/or multiple hardware accelerators, such as hardware accelerator 16B. The CMT 10 also includes a memory controller 18 and an input/output (I/O) interface circuit 20. In various embodiments, more than one memory controller 18 and/or I/O interface circuit 20 may be included. The MT cores 14A-14B, the hardware accelerators 16A-16B, the memory controller 18, and the I/O interface circuit 20 are coupled. The memory controller 18 is further coupled to the memory 12, and the I/O interface circuit 20 is coupled to an external I/O interface to couple to one or more I/O devices.

The MT cores 14A-14B are each configured to execute instructions defined in an instruction set architecture implemented by the MT cores 14A-14B. That is, the MT cores 14A-14B each comprise circuitry configured to execute instructions. As the name implies, the MT cores 14A-14B may be multithreaded. That is, the cores may include circuitry to support multiple active threads in the cores 14A-14B at the same time. The cores may select available instructions from different active threads for execution without the intervention of software.

Generally, a thread may comprise a sequence of instructions that is defined as an executable unit and that may be executed in parallel with other threads. Threads may have dependencies on each other (e.g. they may communicate with each other through a defined mechanism such as memory semaphores) or may be independent. Threads may be grouped to perform a defined function, and the threads may be a process. One or more processes may form an application. Thus, an application may comprise one or more threads. Similarly, an OS or Hypervisor may comprise one or more processes, each of which may comprise one or more threads. The MT cores 14A-14B may implement any desired microarchitecture (scalar, superscalar, pipelined, speculative, in-order, out-of-order, etc.)

The hardware accelerators 16A-16B may each comprise circuitry that implements a task or tasks in hardware. Generally, the hardware accelerator 16A-16B may be controlled by software to perform a task on input data to produce output data that can be read by software. For example, the hardware accelerator 16A-16B may be configured to accept commands generated by software that identify the desired task, the source data, and the result location. The tasks for which a given hardware accelerator is designed may vary from embodiment to embodiment, across a wide variety of operations. For example, embodiments are contemplated in which the hardware accelerators 16A-16B implement cryptographic tasks (e.g. encryption or decryption), extensible markup language (XML) processing tasks, network processing tasks, etc. If multiple hardware accelerators are provided, different accelerators may implement different tasks, and/or two or more accelerators may implement the same task, as desired.

The memory controller 18 comprises the circuitry to interface to the memory 12. Various types of memory may be supported by the memory controller 18. For example, static random access memory (SRAM), dynamic RAM (DRAM), synchronous DRAM (SDRAM), double data rate SDRAM (DDR SDRAM), DDR2, Rambus DRAM (RDRAM), etc. may be supported. The I/O interface circuit 20 may bridge between the CMT 10 and one or more I/O interfaces. For example, the I/O interfaces may include the peripheral component interconnect (PCI), PCI Express (PCIe), HyperTransport, Infiniband, etc.

The MT cores 14A-14B, the hardware accelerators 16A-16B, the memory controller 18, and the I/O interface circuit 20 may be coupled in any desired fashion. A shared bus may be used, a packet interface may be used, etc. A hierarchical, indirect coupling may be used. In one embodiment, the CMT 10 may include a level-2 (L2) cache comprising a plurality of banks, and the MT cores 14A-14B may be coupled to the banks through a crossbar structure. The accelerators 16A-16B, the memory controller 18, and the I/O interface circuit 20 may be coupled to the L2 cache as well.

The CMT 10 may comprise a single semiconductor substrate integrating the components shown in the CMT 10. Alternatively, other levels of integration and/or discrete circuitry may be used in other embodiments.

Device 10 employs virtual memory techniques in order to create a larger memory space than the actual physical memory. The virtual address space is partitioned into contiguous blocks of virtual memory called pages. Each page is referenced by a virtual address which has a corresponding physical address. A page table is used to store the correspondence between a virtual address and its related physical page.

Due to its size, the page table is often stored in main memory. In some systems, portions of the page table can be stored in a specialized cache memory termed a translation lookaside buffer (TLB). When a processor requests a particular virtual address, the TLB is searched first for the corresponding physical address instead of accessing the page table in main memory. If the entry is in the TLB (otherwise termed a TLB hit), the physical address is retrieved and used to access memory. If the TLB does not contain the desired virtual address, a TLB miss occurs, and the desired translation is obtained from the page table, or the operating system's fault handler, and inserted into the TLB.

Figure 2:
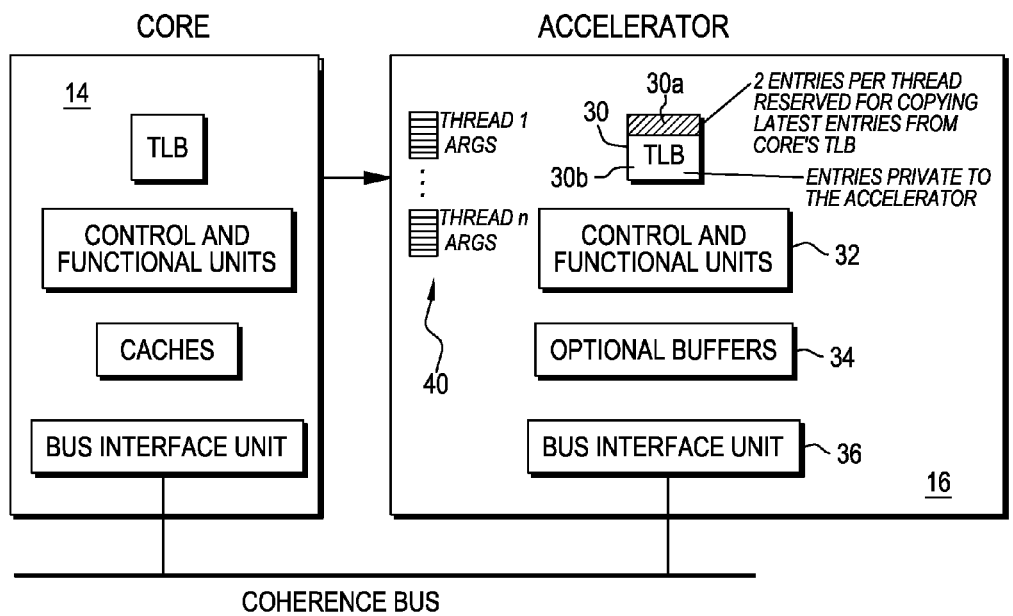
FIG. 2 is a block diagram showing in more detail a processor core and a hardware accelerator in accordance with an embodiment of the invention.

FIG. 2 is a more detailed view of one processor core 14 and an associated hardware accelerator 16 in accordance with an embodiment of the invention. The accelerator contains its own TLB 30, control/functional units 32, private buffers 34 and a bus interface unit 36. While the basic components are similar to those of the core, the major differences are that the accelerator contains no caches (except for its private buffers) and the accelerator's control/functional units have a completely specialized organization to maximize parallelism and efficient execution of special operations.

Accelerator TLB Operation:

The accelerator's TLB is divided into two parts. The first part 30a contains two reserved entries per each thread, and the second part 30b is shared by all the threads. Each time an entry in the core's TLB is updated on behalf of a thread T, the update is simultaneously copied into a reserved entry for T in the accelerator's TLB. Thus, at any time, the two reserved entries for thread T in accelerator's TLB will contain copies of the latest two entries made in the core's TLB on behalf of thread T. This will facilitate the accelerator to start off a thread's command without translation faults, as the core is likely to have translations for the threads in the TLB.

The second part 30b of the accelerator's TLB is used for all other translation entries needed during the accelerator's operation on behalf of any thread. It is possible that this might give rise to duplicate entries in the two parts of accelerator's TLB. The design may have provisions to deal with multiple hits in the TLB for proper resolution. Each time any TLB entry is invalidated by the system software, it is performed in both the core's and the accelerator's TLBs.

Transparency of Accelerator to System Software:

In an embodiment, it might be desirable for the accelerator to be completely transparent to the system software. This may not be possible in some systems that directly manipulate hardware resources like a TLB. In large systems, the system software does not directly update entries in the TLB. The system software simply updates the page table in memory. The translation unit in hardware (MMU) keeps the TLB as a cache for the page table. Whenever MMU does not find a translation in the TLB, the MMU walks through this page table and fills in the desired entry into the TLB and proceeds without software intervention. When an entry is not found in the page table and when the hardware retries the translation the next time, the hardware can find the entry to be copied into the TLB. In such machines, the two TLBs of the core and the accelerator can be managed in the manner described above, without the system software having any knowledge of the presence of an accelerator.

In smaller systems, such as embedded systems, the hardware does not have the capability to walk through tables in memory and hence generates an interrupt when a translation is not found in the TLB. The system software uses TLBwrite instructions to actually update an entry in the TLB with the new translation. In such cases, the management of the two TLBs as described above can still be achieved, by suitably modifying the implementation. The hardware tracks whether the TLBwrite is being issued in the context of a translation fault generated by the core or accelerator and updates the corresponding TLB.

If the transparency can be sacrificed, the design can be made simpler by providing separate TLBwrite instructions for the core and accelerator, and the system software issues the appropriate instruction based on the context. Alternatively, the TLBwrite instruction can modify both TLBs, thereby sacrificing the independence of the two TLBs.

In systems that have multiple levels of translations (such as segments and pages), the above arguments apply for each level of translation, and appropriate mechanisms are instituted for each level. Thus, SLBs (segment look aside buffer) are handled in a similar manner.

Argument Register Banks:

The interface contains a series of registers 40, comprised of one bank of registers per thread, that holds the input operands for the accelerator operation. Each bank contains space to record the contents of, for example, registers R3 thru R8 of the core when the acc instruction is executed. In addition, each bank has status bits to indicate whether a valid command is in the bank and whether execution of that command is in progress or completed.

Accelerator Command Submission:

When thread T of the core executes an acc instruction, the core copies the contents of the thread's registers R3 thru R8 into the argument register bank for thread T in the accelerator and sets the thread's status as valid (and not executing). By convention, the R3 contains the code for the operation the accelerator is supposed to perform. Thread T is then suspended.

Accelerator Command Completion:

When the accelerator completes a command issued by thread T, with the result stored in the first entry of the accelerator's argument register bank, that result value is copied into the R3 of thread T in the core, the acc instruction is marked as complete, and thread T is awakened to continue with its next instruction. The argument register bank for T is marked as invalid. The accelerator finds another thread's valid command, if any, and commences its execution.

Accelerator has a Translation Fault:

When the accelerator 16 encounters a translation fault during its execution of a command from thread T, the accelerator suspends its execution and submits a DSIR interrupt to the system software on behalf of thread T. The accelerator waits for the completion of the fault handler. The handler has two outcomes. One outcome is that the handler provides the desired translation in the page table and causes the core 14 to re-execute the acc instruction. The accelerator, in its suspended state, interprets this as resumption and continues its execution from where the accelerator left off. The other possible outcome is that the system software terminates the thread (for example, in the event of a protection violation). In this case, provision is made (as part of the exit procedure for the thread) to issue an acc command with an opcode indicating termination. When this happens, the accelerator marks the command as invalid and selects another thread for execution.

Bus Interface Unit in the Accelerator:

The bus interface unit in the accelerator is responsible for executing all load/store operations for the accelerator. It also snoops the bus and provides appropriate responses as per the rules of the coherence protocol. If the bus interface unit maintains load/store queues during its operation, the interface unit completes its pending stores before acknowledging any invalidations or sync requests.

In an embodiment, the accelerator is not responsible for any synchronizations that a program needs to make the acc operation atomic. If such atomicity is need by the program, suitable locking protocol code may precede and/or succeed the acc instruction and the accelerator does not need to play a role in this.

Compiler Conventions for Accelerator Operations:

For each function to be accelerated, the compiler generates code to store the operation code in RO and to store the rest of the arguments in R4 through R9. The compiler also issues an lwsync instruction to ensure that any data that it has stored in the memory is visible globally, so that the accelerator does not get any stale data when the accelerator accesses memory. Finally, the compiler generates an isync instruction followed by the acc instruction. The isync instruction ensures that the accelerator is not started until all previous instructions by that thread are completed.

Accelerator Operations:

To illustrate the accelerator operations, the following listed operations may be implemented in the accelerator. More operations can be added as needed or desired.

acc arg0-chksum, arg1=startAddr, arg2=byteCount. The accelerator computes checksum for the memory region between startAddr and startAddr+byteCount and returns the chksum.

acc afrg0=encrypt, arg 1=startAddr, arg2=destAddr, arg3=byteCount. The accelerator encrypts the memory contents from startAddr and startAddr+byteCount and stores the result in memory starting at deasstAddr and returns the byteCount of result.

acc arg0=decrypt, arg1=startAddr, arg2=destAddr, arg3=byteCount. The accelerator decrypts the memory contents from startAddr and startAddr+byteCount and stores the result in memory starting at destAddr and returns the byteCount of result.

acc arg0=compress, arg1=startAddr, arg2=destAddr, arg3=byteCount. The accelerator compresses the memory contents from startAddr and startAddr+byteCount and stores the result in memory starting at destAddr and returns the byteCount of result.

acc arg0=decompress, arg1=startAddr, arg2=destAddr, arg3=byteCount. The accelerator decompresses the memory contents from startAddr and startAddr+byteCount and stores the result in memory starting at destAddr and returns the byteCount of result.

acc arg0=sort, arg-startAddr, arg2=recordSizee, arg3=recordCount, arg4=fieldStart, arg5=fieldWidth. The accelerator sorts the specified records in memory (in situ) and returns 0.

acc afg0=move, arg1=stratAddr, arg2=destAddr, arg3=byteCount. The accelerator copies the memory contents from startAddr and startAddr+byteCount into memory starting at destAddr and returns the byteCount of result.

acc arg0=compare, arg1=startAddr, arg2=destAddr, arg3=byteCount. The accelerator makes a string comparison of the memory contents from startAddr and startAddr+byteCount with contents of memory starting at destAddr and returns the number of first byte that differs.

acc arg0=unicodeConvert, art1=startAddr, arg2=destAddr, arg3=byteCount, arg4=srcType, arg5=destType. The accelerator converts the memory contents from startAddr and startAddr+byteCount, which are Unicode specified by arg4 and converts into Unicode specified by arg5 and stores the result in memory starting at destAddr and returns the byteCount of result.

acc arg0=culturalSort, arg1=startAddr, arg2=destAddr, arg3=byteCount, arg4=srcType, arg5=sortChart. The accelerator converts the memory contents from startAddr and startAddr+byteCount, which are Unicode specified by arg4 and sorts it as specified by chart stored in memory at sortChart and stores the result in memory starting at destAddr and returns the byteCount of result.

acc arg0=uncachedLoad, arg1=startAddr. The accelerator returns the contents of memory startAddr (8 bytes).

acc arg0=uncachedStore, arg1=startAddr, arg2=srcData, arg3=byteCount. The accelerator stores the first byteCount bytes from srcData in memory starting at startAddr and returns the byteCount.

The above operations are some examples for the accelerator. The accelerator can implement many other similar functions. For example, the system may be extended to have multiple accelerators shared by a core or multiple cores sharing one or more accelerators. The argument register banks are instantiated one for each core, and appropriate algorithms handle the scheduling of requests to the accelerators.

The Intel QuickAssist Technology Accelerator Abstraction Layer (AAL) defines and implements a portable programming model for accelerators. It allows one application, written against that layer to execute on several types of accelerated systems (and even in systems without accelerators). In particular, it supports accelerators connected to the processor in different ways: through the I/O channels (PCI-e); through the front-side bus (FSB); and through a scalable shared-memory interconnect (QPI). The accelerators themselves can be implemented through FPGAs, GPUs, light weight cores or as special function processors.

Although the AAL is targeted at portability across several types of accelerators, the AAL may be particularly appropriate with accelerators connected through an I/O channel. (What are referred to as Type III accelerators). Using an accelerator through AAL involves several layers of software for setting up an accelerator, invoking it and reading its results. In particular, a memory area must be allocated and pinned in the memory for passing any arguments between the host and the accelerator, so that the accelerator can access the data in an uninterrupted manner during its execution. The interface is also intended to let the accelerator execute asynchronously with the invoking thread, in its own context.

In contrast, the accelerator (a Type II accelerator) used in embodiments of this invention is designed for a much tighter coupling between the main processor and the accelerator(s). The accelerator functions are performed in the context of the invoking thread. In particular, the accelerator avoids the need for memory pinning, as the accelerator is allowed to access memory in the thread context, with the same levels of translation privilege and protection. Hardware and OS memory management functions are performed on behalf of the accelerator in a transparent manner. The accelerator can be interrupted during execution in the same way as any processor instruction, and modern features such as partition migration are fully supported. The invocation interface between the main processor and the accelerator may be extremely simple (executing one special instruction) and may involve no layers of intermediate software.

While it is apparent that the invention herein disclosed is well calculated to fulfill the objectives discussed above, it will be appreciated that numerous modifications and embodiments may be devised by those skilled in the art, and it is intended that the appended claims cover all such modifications and embodiments as fall within the true spirit and scope of the present invention.

What is claimed is:

1. A method of interfacing between a multi-threaded processing core and a hardware accelerator, wherein multiple threads are operating on the processing core, the method comprising:
reserving in a buffer on the hardware accelerator a respective one or more entries for each of the multiple threads;
copying from the multi-threaded processing core to the hardware accelerator memory address translations related to a specified operation for each of the multiple threads; and
simultaneously storing on the hardware accelerator one or more of the memory address translations for each of the multiple threads in the one or more entries reserved for said each of the multiple threads in the buffer on the hardware accelerator;
whereby when any one of the multiple threads operating on the multi-threaded processing core instructs the hardware accelerator to perform the specified operation related to said any one of the threads, the hardware accelerator has stored thereon one or more of the memory address translations for said any one of the multiple threads to facilitate starting said specified operation without memory translation faults.

2. The method according to claim 1, wherein the copying includes, each time one of said memory address translations is updated on the multi-threaded processing core, copying the updated one of the memory address translations to the hardware accelerator.

3. The method according to claim 2, further comprising when one of said memory address translations on the hardware accelerator is changed, changing said one of the memory address translations on the multi-threaded processing core to help maintain memory address translation consistency between the hardware accelerator and the multi-threaded processing core.

4. The method according to claim 3, further comprising when one of said memory address translations is invalidated on the multi-threaded processing core, invalidating said one of the memory address translations on the hardware accelerator to help maintain memory address translation consistency between the multi-threaded processing core and the hardware accelerator.

5. The method according to claim 1, wherein:
the hardware accelerator includes a translation lookaside buffer (TLB) storing the memory address translations copied to the hardware accelerator;
the multi-threaded processing core includes a TLB storing the memory address translations for the multiple threads operating on the multi-threaded processing core; and
the method further comprises operating the TLB of the multi-threaded processing core independently of the TLB of the hardware accelerator.

6. The method according to claim 5, wherein the operating the TLB of the multi-threaded processing core includes updating the memory address translations in the TLB of the multi-threaded processing core independently of changes to the memory address translations in the TLB of the hardware accelerator.

7. The method according to claim 1, wherein system software operates on the multi-threaded processing core, and the method further comprises when the hardware accelerator encounters a translation fault during execution of a command from one of the multiple threads, the hardware accelerator submitting an interrupt to said system software to respond to said translation fault.

8. The method according to claim 7, further comprising providing a desired translation to the hardware accelerator to correct for said translation fault in response to said interrupt.

9. The method according to claim 7, further comprising terminating said one of the multiple threads in response to said interrupt.

10. The method according to claim 5, wherein the multi-threaded processing core and the hardware accelerator encounter translation faults, and the method further comprises:
issuing Translation Lookaside Buffer (TLB) write instructions in response to said translation faults; and
the multi-threaded processing core tracking whether each TLB write instruction is issued in the context of a translation fault generated by the multi-threaded processing core or by the hardware accelerator, and updating the TLB of the multi-threaded processing core when said each TLB write instruction is issued in the context of a translation fault generated by the multi-threaded processing core, and updating the TLB of the hardware accelerator when said each TLB write instruction is issued in the context of a translation fault generated by the hardware accelerator.

11. A system for interfacing between a multi-threaded processing core and a hardware accelerator, comprising:
one or more processing units on the multi-threaded processing core configured for copying from the multi-threaded processing core to the hardware accelerator memory address translations related to a specified operation for each of multiple threads operating on the multi-threaded processing core; and
a translation lookaside buffer (TLB) on the hardware accelerator and including a respective one or more reserved entries for each of the multiple threads operating on the multi-threaded processing core for simultaneously storing one or more of the memory address translations for each of said multiple threads in the one or more entries reserved for said each of the multiple threads;
whereby when any one of the multiple threads operating on the multi-threaded processing core instructs the hardware accelerator to perform the specified operation, the hardware accelerator has stored thereon one or more of the memory address translations for said any one of the multiple threads to facilitate starting said specified operation without memory translation faults.

12. The system according to claim 11, wherein the one or more processing units on the multi-threaded processing core are configured for copying an updated one of the memory address translations to the hardware accelerator each time one of the memory address translations is updated on the multi-threaded processing core.

13. The system according to claim 12, wherein the one or more processing units on the multi-threaded processing core are configured for changing one of the memory address translations on the multi-threaded processing core when said one of the memory address translations is changed on the hardware accelerator to help maintain memory address translation consistency between the hardware accelerator and the multi-threaded processing core.

14. The system according to claim 11, wherein:
the multi-threaded processing core includes a Translation Lookaside Buffer (TLB) storing the memory address translations for the multiple threads operating on the multi-threaded processing core; and
the one or more processing units are configured for operating the TLB of the processing core independently of the TLB of the hardware accelerator.

15. The system according to claim 1, wherein system software operates on the multi-threaded processing core, and when the hardware accelerator encounters a translation fault during execution of a command from one of the multiple threads, the hardware accelerator submits an interrupt to said system software to respond to said translation fault.

16. An article of manufacture comprising:
at least one tangible non-transitory computer readable device having computer readable program code logic tangibly embodied therein to execute machine instructions in one or more processing units for interfacing between a processing core and a hardware accelerator, wherein multiple threads operate on the processing core and a respective one or more entries are reserved in a buffer on the hardware accelerator for each of the multiple threads, said computer readable program code logic, when executing, performing the following:
copying from the processing core to the hardware accelerator memory address translations related to a specified operation for each of the multiple threads; and
simultaneously storing one or more of the memory address translations for each of the multiple threads in the one or more entries reserved for said each of the multiple threads in the buffer on the hardware accelerator;
whereby when any one of the multiple threads operating on the processing core instructs the hardware accelerator to perform the specified operation, the hardware accelerator has stored thereon one or more of the memory address translations for said any one of the multiple threads to facilitate starting said specified operation without memory translation faults.

17. The article of manufacture according to claim 16, wherein the copying includes, each time one of said memory address translations is updated on the multi-threaded processing core, copying the updated one of the memory address translations to the hardware accelerator.

18. The article of manufacture according to claim 16, wherein the hardware accelerator includes a translation lookaside buffer (TLB) storing the memory address translations copied to the hardware accelerator, and the processing core includes a TLB storing the memory address translations for the multiple threads operating on the processing core, and wherein said computer readable program code logic, when executing, performs the following:
operating the TLB of the processing core independently of the TLB of the hardware accelerator.

19. The article of manufacture according to claim 17, wherein the operating the TLB of the processing core includes updating the memory address translations in the TLB of the multi-threaded processing core independently of changes to the memory address translations in the TLB of the hardware accelerator.

20. The article of manufacture according to claim 16, wherein the multi-threaded processing core and the hardware accelerator encounter translation faults, and said computer readable program code logic, when executing, further performs the following:
issuing TLB write instructions in response to said translation faults; and
tracking whether each TLB write instruction is issued in the context of a translation fault generated by the multi-threaded processing core or by the hardware accelerator, and updating the TLB of the multi-threaded processing core when said each TLB write instruction is issued in the context of a translation fault generated by the multi-threaded processing core, and updating the TLB of the hardware accelerator when said each TLB write instruction is issued in the context of a translation fault generated by the hardware accelerator.

* * * * *